United States Patent [19]

Barsotti et al.

[11] Patent Number: 5,093,391
[45] Date of Patent: Mar. 3, 1992

[54] MULTI-COMPONENT COATING COMPOSITION COMPRISING AN ANHYDRIDE CONTAINING POLYMER, A GLYCIDYL COMPONENT AND AN ACID FUNCTIONAL COMPONENT

[75] Inventors: Robert J. Barsotti, Franlinville, N.J.; Lee R. Harper, Media, Pa.

[73] Assignee: E. I. Du Pont de Nemours and Company, Wilmington, Del.

[21] Appl. No.: 538,528

[22] Filed: Jun. 15, 1990

Related U.S. Application Data

[63] Continuation-in-part of Ser. No. 212,054, Jun. 27, 1988, abandoned.

[51] Int. Cl.⁵ .............................................. C08L 33/08
[52] U.S. Cl. ................................. 523/400; 523/437; 523/439; 525/74; 525/94; 525/108; 525/113; 525/116; 525/117; 525/118; 525/119; 525/207; 525/208; 525/221
[58] Field of Search .................... 523/400, 437, 439; 525/74, 108, 113, 116, 117, 118, 119, 207, 208, 221

[56] References Cited

U.S. PATENT DOCUMENTS

| | | | |
|---|---|---|---|
| 3,136,736 | 6/1964 | Washburne et al. | 525/119 |
| 3,509,086 | 4/1970 | Rohrbacher | 523/400 |
| 3,803,111 | 4/1974 | Munro et al. | 528/493 |
| 3,969,327 | 7/1976 | Stein et al. | 525/108 |
| 4,038,454 | 7/1977 | Lehman | 525/371 |
| 4,056,506 | 11/1977 | Heilman et al. | 523/439 |
| 4,452,948 | 6/1984 | Marrion et al. | 525/207 |
| 4,507,411 | 3/1985 | Gordon et al. | 523/436 |
| 4,657,975 | 4/1987 | Kodama et al. | 525/74 |
| 4,732,791 | 3/1988 | Blackburn et al. | 427/407 |
| 4,816,500 | 3/1989 | Corcoran | 523/437 |

FOREIGN PATENT DOCUMENTS

| | | |
|---|---|---|
| 0661943 | 4/1963 | Canada . |
| 0123793 | 11/1984 | European Pat. Off. . |
| 2853671 | 6/1980 | Fed. Rep. of Germany . |
| 0994881 | 6/1965 | United Kingdom . |

*Primary Examiner*—John Kight, III
*Assistant Examiner*—Frederick Krass
*Attorney, Agent, or Firm*—Chris P. Konkol

[57] ABSTRACT

A coating composition useful for a finish for automobiles and trucks in which the film forming binder contains reactive binder components of about (a) 25-90% by weight, based on the weight of the binder, of an acrylic polymer having at least two reactive anhydride groups composed of polymerized monomers of an ethylenically unsaturated anhydride and polymerized monomers from the group consisting of alkyl methacrylate, alkyl acrylate and any mixtures thereof, wherein the alkyl groups have 1-8 carbon atoms and the polymer has a weight average molecular weight of about 2,000-50,000;

(b) 5-50% by weight, based on the weight of the binder, of a glycidyl component having at least two reactive glycidyl groups;

(c) 5-50% by weight, based on the weight of the binder of an acid functional monomeric, oligomeric or polymeric compound which may or may not contain hydroxyl functionality; and the composition contains about 0.1-5% by weight; based on the weight of the binder, of a catalyst.

17 Claims, No Drawings

MULTI-COMPONENT COATING COMPOSITION COMPRISING AN ANHYDRIDE CONTAINING POLYMER, A GLYCIDYL COMPONENT AND AN ACID FUNCTIONAL COMPONENT

CROSS REFERENCE TO RELATED APPLICATIONS

This application is a continuation-in-part of co-pending application Ser. No. 07/212,054 filed Jun. 27, 1988, now abandoned.

FIELD OF THE INVENTION

This invention is related to a multi-component coating composition.

BACKGROUND

There are a wide variety of multi-component coating compositions available for finishing substrates. Typically with these compositions, the components are mixed together before application and then the resulting composition is applied by conventional techniques such as spraying and the composition is cured at ambient temperatures or can be cured at elevated temperatures. These compositions are used to finish original equipment, automobiles and trucks, refinish automobiles and trucks, paint structures such as bridges and buildings, paint appliances, metal cabinets and the like.

Representative of such compositions are shown in the following patents:

Gordon et al. U.S. Pat. No. 4,507,411, issued Mar. 26, 1985 shows a two component composition of a functionalized polymeric component and glycidyl component that in the presence of an amine, alcohol, ketimine, acetal or oxazolidine cures at ambient temperatures. However, the compositions disclosed are not useful for finishes for automobiles and trucks.

European Patent Application 0,123,793 shows a two component composition in which one component has an anhydride ring that is opened with an amine and has a second component that contains glycidyl groups. Finishes formed from such compositions are not useful for automobiles and trucks since the finishes whiten and blister on exposure to high humidity conditions and exhibit recoat lifting when repaired within several days after the finish has been applied.

U.S. Pat. No. 3,136,736 issued Jun. 9, 1964, to Wyncote et al and British patent 994,881 assigned to Rohm and Haas concern coating compositions comprising polyepoxides and maleic anhydride copolymers. The patents do not teach or suggest the use of an acid functional monomeric, oligomeric, or polymeric compound.

U.S. Pat. No. 4,732,791 issued Mar. 22, 1988, to Blackburn et al concerns a coating composition comprising polyepoxides, a monomeric anhydride curing agent and a low number average molecular weight hydroxyl group containing polyfunctional functional material. However, the composition disclosed must be heated to cure, contains monomeric rather than polymeric anhydride, and does not contain an acid functional monomeric, oligomeric or polymeric compound.

There is a need for a coating composition that cures at ambient or elevated temperatures with a long pot life and provides a high quality finish that is useful as an exterior finish or refinish for automobiles and trucks that has excellent adhesion to the substrate to which it is applied, good outdoor weatherability, humidity resistance and color.

SUMMARY OF THE INVENTION

A coating composition containing 20-80% by weight of reactive binder components and 80-20% by weight of an organic carrier:
the binder contains
(a) an anhydride acrylic polymer having at least two anhydride groups and having a weight average molecular weight of about 2,000-50,000;
(b) a component having at least two reactive glycidyl groups;
(c) an acid functional monomeric, oligomeric, or polymeric compound which may or may not contain hydroxyl functionality; and
the composition contains about 0.1-5% by weight, based on the weight of the binder, of a catalyst.

DETAILED DESCRIPTION OF THE INVENTION

The film forming binder of the coating composition of this invention contains components that are mixed together before application. The film forming binder content of the composition is about 20-80% by weight of an organic carrier which usually is a solvent for the binder.

The composition forms an excellent clear coating over colored pigmented finishes. The coating has good adhesion to the pigmented finish, has excellent humidity resistance and is weatherable and durable. The composition is useful for finishing and refinishing the exterior of automobiles and trucks and the composition can be pigmented to form a colored finish. Also, the composition can be used over plastic substrates used in automobiles and trucks such as filler panels, side panels, fender extensions, moldings and other trim parts.

The composition also can be pigmented to form a colored finish. These pigmented compositions are useful as exterior original equipment and refinish coatings for automobiles and trucks, as maintenance coatings for tanks, bridges, buildings such as factories and oil refineries and as industrial coatings for appliances, metal cabinets, shelves and the like.

Preferably, the coating composition has a high solids content and contains about 40-80% by weight binder and 20-60% by weight of organic solvent. The binder of the composition contains about 25-90% by weight of anhydride acrylic polymer containing at least two anhydride groups, 5-50% by weight of a glycidyl containing component and 5-50% by weight of an acid functional monomeric, oligomeric, or polymeric compound which may or may not contain hydroxyl functionality. The binder should contain a maximum of 25%, based on the weight of the binder of aromatic vinyl.

The anhydride acrylic polymer has a weight average molecular weight of about 2,000-50,000 determined by gel permeation chromatography using polymethyl methacrylate as a standard and preferably, has a weight average molecular weight of 3,000-25,000.

The anhydride acrylic polymer is prepared by conventional techniques in which the monomers, solvent, and conventional catalysts such as t-butyl perbenzoate are charged into a polymerization vessel and heated to about 75°-200° C. for about 0.5-6 hours to form the polymer.

The anhydride acrylic polymer is formed by polymerizing monomers of alkyl methacrylates, or alkyl acrylates or mixtures thereof, where the alkyl groups have 1-12 carbon atoms and ethylenically unsaturated anhydrides (or ethylenically unsaturated dicarboxylic acids which are converted to the acid anhydride during the polymerization). Optionally, the anhydride acrylic polymer can contain other components such as styrene, α-methyl styrene, acrylonitrile, methacrylonitrile in amounts of about 0.1-50% by weight.

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, acrylo alkoxy silanes such as gamma methacryloyl propyl trimethoxy silane. Also the anhydride acrylic polymer can contain about 0.1-5% by weight of an ethylenically unsaturated acid such as acrylic acid, methacrylic acid, itaconic acid, maleic acid and the like.

Typically useful ethylenically unsaturated anhydrides are as follows: itaconic anhydride, maleic anhydride, isobutenyl succinic anhydride and the like. As stated above, it is also possible to impart the anhydride functionality to the anhydride acrylic polymer by using an ethylenically unsaturated dicarboxylic acid which converts to the acid anhydride during the reaction. Ethylenically unsaturated dicarboxylic acids that can be used are itaconic acid, maleic acid, isobutenyl succinic acid and the like.

Preferred anhydride acrylic polymers are as follows: styrene/butyl methacrylate/butyl acrylate/itaconic anhydride, methyl methacrylate/butyl acrylate/itaconic anhydride, butyl acrylate/styrene/maleic anhydride/maleic acid, methyl methacrylate/butyl acrylate/itaconic anhydride.

The glycidyl component contains at least two glycidyl groups and can be an oligomer or a polymer. Typical glycidyl components are as follows: sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A., di- and polyglycidyl esters of acids, polyglycidyl ethers of isocyanurates, such as "Denecol" EX301 from Nagase Sorbitol polyglycidyl ethers, such as Araldite XUGY-358 ® from Ciba-Geigy, and di- and polyglycidyl esters of acids, such as Araldite CY-184 ® from Ciba-Geigy are preferred since they form high quality finishes.

Glycidyl methacrylate or acrylate containing acrylic polymers can be used such as random and block polymers of glycidyl methacrylate/butyl methacrylate. The block polymers can be prepared by anionic polymerization or by group transfer polymerization.

An acid functional monomeric, oligomeric, or polymeric compound which may or may not contain hydroxyl functionality is added to the coating composition to give improved color and longer pot life. It does this without adversely affecting the crosslinking between the anhydride and glycidyl components. The monofunctional, non-hydroxyl components of these types must be volatile under the cure conditions.

The acid functional material can be polymeric in nature and formed by polymerizing monomers of alkyl methacrylates, or alkyl acrylates or mixtures thereof, where the alkyl groups have 1-12 carbon atoms and ethylenically unsaturated acids. Optionally, the acid functional polymer can also contain other components such as styrene, α-methyl styrene, acrylonitirle, methacrylonitrile in amounts of about 0.1-50% by weight.

Typical alkyl acrylates and methacrylates that can be used to form the acid functional polymer are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the acid functional acrylic polymer are acrylamide, methacrylamide, acrylo alkoxy silanes such as, gamma-methacryloylpropyltrimethoxy silane.

Typically useful ethylenically unsaturated acids are as follows: acrylic acid, methacrylic acid, itaconic acid, maleic acid and the like.

This polymer may also contain hydroxyl functionality by using monomers such as hydroxyethylacrylate, hydroxyethyl methacrylate and hydroxypropyl acrylate. The hydroxy functionality may be introduced by a post reaction of the acid with epoxy containing compounds such as Cardura E ® from Shell Chemical Company (a glycidyl ester of versatic acid) and propylene oxide.

The acid functional material may also be monomeric in nature and may include both acid and hydroxyl functionality. Examples of such compounds are acetic acid, glycolic acid, lactic acid and citric acid.

Typical solvents used to prepare the anhydride acrylic polymer and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates.

In addition to the solvents listed above, certain alcoholic solvents are also useful. The alcoholic solvents under certain use conditions convert portions of the anhydride to a half ester also useful as reactants in this system. Examples of such alcohols are propanol, isobutanol, methanol, isopropanol, tertiary butanol, n-butanol, propylene glycol monomethyl ether, ethylene glycol monobutyl ether, and other alcoholic solvents.

About 0.1-5% by weight, based on the weight of the binder of the coating composition, of a catalyst is added to enhance curing of the composition. Typical catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, N,N,N$^1$,N$^1$-tetramethylethylenediamine, N,methyldiethanolamine, N,N-dimethyl-1,3-propanediamine and 1-dimenthylamino-2-propanol or quaternary ammonium salts such as tert-butyl ammonium bromide, benzyl trimethyl ammonium formate and the like.

The catalyst need not be added to the coating composition. After an article is coated, the article is passed into a chamber containing catalyst vapors. Dimethylethanol amine is a catalyst that can be vaporized and used to cure the composition. Also, to achieve curing, the catalyst can be sprayed with the coating composition using a dual spray gun.

Generally, the composition is applied by conventional techniques such as spraying and electrostatic spraying. The composition is applied as a multi-package system. Multi-package means that at least some of the components are kept separate until shortly before their application. For instance the glycidyl component must be kept separated from the acid and/or anhydride component. The resulting coating can be dried and cured at ambient temperatures or can be cured at elevated temperatures of 60° to 200° C. At ambient temperatures, the coating dries to a tack free condition in about 180 minutes and in about 24 hours the coating is substantially cured. In about 5-7 days, the coating is completely cured. Coatings are applied to form a finish about 0.5-5 mils thick, and preferably 1-2 mils thick. The finish has excellent gloss, good adhesion to substrate, excellent weatherability, and high solids.

To improve weatherability of the clear finish of the coating composition, about 0.1-5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1-5% by weight, based on the weight of the binder, of an antioxidant can be added.

Typical ultraviolet light stabilizers that are useful are as follows:

Benzophenones such as hydroxydodecyclobenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl) triazoles, substituted benzotriazoles such as hydroxyphenyltriazoles such as 2-(2'hydroxy-5'-methylphenyl) benzotriazole, 2-(2'hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-$\beta$-(3,5-di-t-butyl-4-hydroxyphenyl)propionate, $\alpha,\alpha'$-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenyl-phosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-naphthalimides, $\alpha$-cyano-$\beta,\beta$-diphenylacrylic acid derivatives, bis(2-benzoxazolyl)alkanes, bis(2-naphthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl-1,3,8-triazasprio(4,5)decanol-2,4-dione.

Particularly useful ultraviolet light stabilizers that can be used are hindered amines of piperidyl derivatives such as those disclosed in Murayama et al., U.S. Pat. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following blend of ultraviolet light stabilizers can be used: 2-[2'-hydroxy-3',5'-1(1-1-dimethyl-propyl)-phenyl]-benzotrizole and bis-[4-(1,2,2,6,6-pentamethyl-piperidyl)] 2-butyl-2-[(3,5-t-butyl-4-hydroxyphenyl)-methyl] propanedioate. The stabilizers can be sued in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3 hydroxy-3,5'-ditert amyl phenyl) benzotriazole.

Generally, when the coating composition of this invention is used as a clear coating, it is applied by conventional spraying techniques, to a color or base coat of an automobile or truck, preferably, electrostatic spraying is used. The coatings are baked at about 60° to 140° C. for about 10 to 40 minutes. In refinishing automobiles and trucks, the clear coating is applied to a color coat and then can be dried at ambient temperatures or baked to form a clear finish. The resulting clear coat or finish is about 1-5 mils thick, preferably 1-2 mils thick, and has excellent gloss, good adhesion to the color coat and excellent weatherability.

The composition can be pigmented to form a colored finish or primer. About 0.1-200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The following examples illustrate the invention. All parts and percentages are on a weight basis unless indicated otherwise. Molecular weights are determined by gel permeation chromatography using polymethyl methacrylate as the standard.

EXAMPLE I

Anhydride Acrylic Polymer

The following constituents were charged into a reactor with a thermometer, stirrer, dropping funnel, nitrogen induction tube and condensor:

|  | Parts by weight |
|---|---|
| Portion 1 | |
| Xylene | 182.4 |
| Butyl Acetate | 20.2 |
| Portion 2 | |
| Methylmethacrylate monomer | 96.0 |
| Butylacrylate monomer | 293.4 |

-continued

|  | Parts by weight |
|---|---|
| Xylene | 10.0 |
| Portion 3 | |
| Itaconic Acid | 167.2 |
| Xylene | 59.8 |
| Portion 4 | |
| T-butylperacetate | 26.7 |
| Butyl Acetate | 10.6 |
| Xylene | 6.7 |
| Total | 973.0 |

Portion 1 was charged to the reactor, covered with a nitrogen blanket and heated to its reflux temperature (approximately 135° C.). Portion 2 is added dropwise over a 180 minute period. Portion 3 is added simultaneously with portions 2 and 4 over a 180 minute period at five minute increment shots of solid itaconic acid followed with washings of xylene. Portion 4 was premixed and added dropwise simultaneously with portions 2 and 3 over a 200 minute period. The resulting composition is then held at reflex until 22 pounds of water per 100 gallon batch size are removed.

The resulting polymer composition had a weight solids content of 64-66% and the polymer had a Gardner-Holdt Viscosity of X-Z2. The polymer had a weight average molecular weight of 3500.

Acid Polymer

The following constituents were charged into a reactor equipped with a thermometer, stirrer, dropping funnel, nitrogen induction tube and condensor:

|  | Parts by Weight |
|---|---|
| Portion 1 | |
| Propylene Glycol Monomethyl Ether Acetate (PM Acetate) | 168.4 |
| Butyl Acetate | 46.3 |
| Xylene | 130.5 |
| Portion 2 | |
| Butyl Acrylate | 254.8 |
| Methacrylic acid | 171.2 |
| Portion 2 | |
| t-butyl Peracetate | 25.5 |
| Xylene | 21.0 |
| Portion 4 | |
| PM Acetate | 72.7 |
| Total | 890.4 |

Portion 1 was charged into the reactor covered with a nitrogen blanked and heated to its reflux (approximately 135°-140° C.). Portion 2 was premixed and added to the reactor dropwise over a 180 minute period. Portion 3 was premixed and added to the reactor dropwise and starting with portion 2 over a 200 minute period. After the addition is complete, the reactor was held at reflux for 60 minutes. Portion 4 is then added to the reactor over 10 minutes and the composition is allowed to cool.

The resulting acid polymer composition had weight solids content of 50-52% and the polymer had a Gardner-Holdt viscosity of Y to Z-4. The polymer had a weight average molecular weight of 5000.

Coating composition was prepared by thoroughly blending together the following constituents:

| Portion 1 | Parts by Weight |
|---|---|
| Anhydride Acrylic Polymer (prepared above) | 192.9 |
| Acid Polymer (prepared above) | 53.4 |
| Butyl Acetate | 70.0 |
| PM Acetate | 164.4 |
| Xylene | 19.0 |
| Tinuvin 1130 ® (Ciba-Geigy UV screener) | 6.1 |
| Tinuvin 292 ® (Ciba-Geigy hindered amine light stabilizer) | 4.1 |
| Araldite CY 184 ® (Ciba-Geigy epoxy resin) | 52.5 |
| 15.5% dimethyl ethanol amine in propanol | 41.6 |
| Total | 604.0 |

The resulting coating composition was reduced to a spray viscosity of 35 seconds measured with a No. 2 Zahn Cup accomplished by adding butyl acetate.

The coating composition was sprayed onto a primed metal panel coated with a waterborne basecoat and cured at 180°-200° F. and provided a clear coat with excellent color, durability, humidity resistance and film properties. The coating composition was also sprayed over solvent borne melamine cured basecoat and cured at 240°-295° F. The resulting coating exhibited excellent color, durability, humidity resistance and other film properties.

EXAMPLE 2

Anhydride Acrylic Polymer 'A'

A styrene/butyl methacrylate/butyl acrylate/itaconic acid(anhydride) copolymer was prepared as follows:

A reactor was loaded with 696.7 parts of xylene and 58.1 parts butyl acetate and heated to reflux temperature under nitrogen. The reactor was fitted with a variable takeoff distillation head to facilitate removal of distillate or reflux as needed.

Then a mixture of the following was added at a uniform linear rate over three hours while maintaining reflux.

| Styrene monomer | 276.1 parts |
|---|---|
| Butyl methacrylate monomer | 844.0 parts |
| Xylene | 28.8 parts |

Concurrently the following solid monomer was added in uniform shots every five minutes:

| Itaconic acid | 481.0 parts |
|---|---|

Also concurrently, but for a period of 200 minutes, the following initiator solution was added at a uniform linear rate

| Tertiary butyl peroxyacetate | 76.8 parts |
|---|---|
| PM acetate | 30.5 parts |
| Xylene | 19.3 parts |
| Total | 1756.5 parts |

During the polymerization, water is formed by dehydration of the polymerized itaconic acid so the anhydride is formed. This water is continuously removed by the water separator distillation apparatus until a total of 63.3 parts of water is separated from the distillate.

This polymer solution had a Gardner-Holdt viscosity of $Z1+\frac{1}{2}$ and a measured solids of 69.7%. The anhydride content was determined to be 0.91 Meq/gm and the acid content to be 0.19 Meq/gm. The molecular weight was measured by gel permeation chromatography to be Mn=2074 and Mw=5093.

Acid Polymer 'B'

A butyl acrylate/methacrylic acid copolymer was prepared as follows:

A reactor was charged with the following:

| | |
|---|---|
| PM acetate | 1604.0 parts |
| Butyl acetate | 441.0 parts |
| Xylene | 1243.0 parts |

This mixture was heated with agitation under nitrogen to reflux. Then the following mixture was added at a uniform, linear rate over three hours while maintaining reflux.

| | |
|---|---|
| Butyl acrylate monomer | 2427.0 parts |
| Methacrylic acid monomer | 1630.0 parts |
| Tertiary butyl peroxyacetate | 224.0 parts |

Then the following mixture was added over ten minutes while maintaining reflux temperature:

| | |
|---|---|
| Xylene | 200.0 parts |
| Tertiary butyl peroxyacetate | 19.0 parts |

The reaction mixture was maintained for one hour at reflux temperature and then diluted with the following:

| | | |
|---|---|---|
| PM Acetate | | 692.0 parts |
| | Total | 8480.0 parts |

This polymer had a Gardner-Holdt viscosity of $Z1+\frac{1}{2}$ and a measured solids of 52.3%. The acid content was determined to be 2.28 Meq/gm and molecular weight by gel permeation chromatography was Mn=2762, Mw=6108

| Clearcoat Formulation | |
|---|---|
| Part I | |
| Anhydride acrylic polymer "A" described above) | 211.4 parts |
| Acid polymer "B" (described above) | 83.2 parts |
| Tinuvin 1130 ® | 10.3 parts |
| 10% solution of Tinuvin 292 ® in xylene | 20.6 parts |
| Resiflow S ® (Flow Additive from Estron Chemical Company) | 1.8 parts |
| PM acetate | 10.8 parts |
| Ethyl acetate | 12.7 parts |
| Part II | |
| Araldite CY184 ® | 56.3 parts |
| Araldite XUGY-358 ® (Ciba-Geigy epoxy resin) | 79.7 parts |
| Part III | |
| N-butyl alcohol | 19.5 parts |
| 10% solution of DABCO ® (triethylene diamine from Air Products Corp) in PM acetate | 27.6 parts |

| Clearcoat Formulation | |
|---|---|
| *-continued* | |
| 10% solution of dimethyl ethanolamine in PM acetate | 55.2 parts |
| Reducing Solvent | |
| PM Acetate | 92.6 parts |
| Ethyl acetate | 3.3 parts |
| Total | 685.0 parts |

This solution was mixed in order and sprayed when mixed.

It was sprayed on a waterborne basecoat on suitably primed panels for evaluation. The coating solution had the following properties:

| | |
|---|---|
| #2 Zahn viscosity | 52 seconds |
| Gallon weight | 8.65 lb/gal |
| Solids | 49.23% |
| V.O.C. | 4.39 lb/gal |

The coated panels were allowed to cure at ambient temperature (70°-75° F.) to a glossy, hard and attractive finished appearance.

EXAMPLE 3

A coating composition was prepared by thoroughly blending together the following constituents:

| | |
|---|---|
| Anhydride acrylic polymer composition (as prepared in Example 1) | 22.4 parts |
| Butyl acetate | 3.0 parts |
| Araldite CY 184 ® | 5.4 parts |
| 20% solution of glycolic acid in propanol | 2.9 parts |
| 15% dimethyl ethanol amine solution in propanol | 4.3 parts |
| Total | 38.0 parts |

The resulting coating composition was reduced to a spray viscosity of 35 seconds measured with a No. 2 Zahn Cup accomplished by adding butyl acetate.

The coating composition was sprayed onto a primed metal panel coated with a waterborne basecoat and cured at 180°-200° F. and provided a clear coat with excellent color, durability, humidity resistance and film properties. The coating composition was also sprayed over solvent borne melamine cured base coat and cured at 240°-295° F. The resulting coating exhibited excellent color, durability, humidity resistance and other film properties.

EXAMPLE 4

A coating composition was prepared by thoroughly blending the following constituents:

| | Parts by Weight |
|---|---|
| Part I | |
| Anydride acrylic polymer (as prepared in Example 1) | 305.39 |
| Tinuvin 1130 ® | 12.59 |
| Resiflow S ® | 2.13 |
| PM acetate | 23.69 |
| Part II | |
| Araldite CY184 ® | 65.09 |
| Araldite XUGY-358 ® | 65.09 |
| Part III | |
| 25% solution of glycolic acid in ethanol | 61.89 |

-continued

| | Parts by Weight |
|---|---|
| Tinuvin 292 ® | 12.80 |
| 25% DABCO ® in ethanol | 45.35 |
| PM acetate | 50.00 |
| Total | 644.02 |

Add in order with mixing. Each part is premixed before adding.

The resulting clearcoat was sprayed on primed panels which had been coated with a waterborne color coat (basecoat).

The clearcoat had the following liquid properties:

| Zahn #2 Viscostiy = | 67 seconds |
|---|---|
| Gallon Weight = | 8.77 |
| Solids = | 57.95% |
| V.O.C. = | 3.62 lb/gal |

The panels were allowed to cure at room temperature and provided a coating with a glossy, hard and attractive finish. The panels were tested after three weeks cure for humidity and salt spray performance. In both tests the panels were rated 8 or higher out of a possible perfect score of 10. (Greater than 6 is considered commercially acceptable.)

We claim:

1. A multi-package coating composition which cures to a hard, glossy and tack free finish, comprising 20-80% by weight of reactive binder components and 80-20% by weight of an organic liquid carrier; wherein the binder contains a maximum of 25%, based on the weight of binder, of aromatic vinyl, and the binder comprises;
   (a) 25-90% by weight, based on the weight of binder, of an anhydride acrylic polymer having at least two reactive anhydride groups and comprises polymerized monomers of an ethylenically unsaturated anhydride or an ethylenically unsaturated dicarboxylic acid and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
   (b) 5-50% by weight, based on the weight of the binder, of a glycidyl component having at least two reactive glycidyl groups;
   (c) 5-50% by weight, based on the weight of the binder, of an acid functional component which is either a substantially saturated acid functional polymer or a monomeric compound having both an acid and hydroxyl functionality; and
   (d) 0.1-5% by weight, based on the weight of the binder, of a curing catalyst;
   wherein components (a), (b) and (c) are separate components and the cure occurs between said acid functional component (c) and/or anhydride component (a) and the glycidyl component (b).

2. The coating composition of claim 1 in which the glycidyl component is selected from the group consisting of polyglycidyl ethers of polyols, epoxy resins of epichlorohydrin and bisphenol A, polyglycidyl esters of polyacids, polyglycidyl ethers of isocyanurates, glycidyl methacrylate or glycidyl acrylate containing acrylic polymers or compatible mixture of any of the above.

3. The coating composition of claim 1 in which the anhydride acrylic polymer contains about 0.1-50% by weight of monomers selected from the group consisting of styrene, acrylonitrile, methacrylonitrile and any mixtures thereof.

4. The coating composition of claim 1 in which the acid functional component is a polymer formed by polymerizing monomers of alkyl methacrylates or alkyl acrylates or hydroxy alkyl acrylates or hydroxy alkyl methacrylates or mixtures thereof, where the alkyl groups have 1-12 carbon atoms, and ethylenically unsaturated acids.

5. The coating composition of claim 4 in which the acid functional component is a polymer of butyl acrylate and methacrylic acid.

6. The coating composition of claim 1 in which the acid functional component contains both acid and hydroxyl functionality.

7. The coating composition of claim 6 in which the acid functional component is glycolic, lactic, or citric acid.

8. The coating composition of claim 4 in which the acid functional component is a polymer of butyl methacrylate, butyl acrylate, hydroxy ethyl acrylate and methacrylic acid.

9. The coating composition of claim 1 in which the anhydride acrylic polymer has a glass transition temperature of 0° to 70° C. and a weight average molecular weight of about 3,000-25,000.

10. The coating composition of claim 9 in which the anhydride acrylic polymer consists essentially of 20-40% by weight, based on the weight of the acrylic polymer of methyl methacrylate, styrene or mixture of methyl methacrylate and styrene, 35-55% by weight of an alkyl methacrylate or an alkyl acrylate having 2-4 carbon atoms in the alkyl group and 5-55% by weight of polymerizable ethylenically unsaturated anhydride or ethylenically unsaturated dicarboxylic acid.

11. The coating composition of claim 10 in which the glycidyl component comprises a polyglycidyl ether of a polyol or a di- or polyglycidyl ester of an acid.

12. The coating composition of claim 11 in which the anhydride acrylic polymer consists of polymerized monomers of methyl methacrylate, butyl acrylate and itaconic acid.

13. The coating composition of claim 10 in which the anhydride acrylic polymer consists essentially of polymerized monomers of methyl methacrylate, styrene, butyl acrylate and itaconic anhydride;
    the glycidyl component consists essentially of sorbitol polyglycidyl ether or the di- or polyglycidyl ester of an acid or a mixture thereof, and the catalyst is triethylene diamine or dimethylethanol amine or a mixture thereof.

14. The coating composition of claim 10 in which the anhydride acrylic polymer consists essentially of polymerized monomers of butyl acrylate, styrene, maleic anhydride and maleic acid,
    the glycidyl component consists essentially of sorbitol polyglycidyl ether or the di- or polyglycidyl ester of an acid or a mixture thereof and the catalyst is triethylene diamine or dimethylethanol amine or a mixture thereof.

15. The coating composition of claim 1 containing about 0.1-200% by weight, based on the weight of the binder, of pigment.

16. The coating composition of claim 1 in which the anhydride acrylic polymer contains up to about 40% by weight of polymerized monomers selected from the group consisting of alkyl acrylate or alkyl methacrylate having 9-12 carbon atoms in the alkyl groups or mixtures thereof.

17. A multi-package coating composition which cures to a hard, glossy and tack free finish, comprising 20-80% by weight of reactive binder components and 80-20% by weight of an organic liquid carrier; wherein the binder contains a maximum of 25%, based on the weight of binder, of aromatic vinyl, and the binder comprises;
   (a) 25-90% by weight, based on the weight of binder, of an anhydride acrylic polymer having at least two reactive anhydride groups and comprising polymerized monomers of an ethylenically unsaturated anhydride or an ethylenically unsaturated dicarboxylic acid and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
   (b) 5-50% by weight, based on the weight of the binder, of a glycidyl component having at least two reactive glycidyl groups;
   (c) 5-50% by weight, based on the weight of the binder,
   (d) 0.1-5% by weight, based on the weight of the binder, of a curing catalyst; wherein components (a), (b) and (c) are separate components and the cure occurs between the acid functional component (c) and/or anhydride component (a) and the glycidyl component (b).

* * * * *